Dec. 20, 1955    A. S. FENSTER ET AL    2,727,347
COMBINED HAY CRUSHER AND TEDDER
Filed Nov. 7, 1952    2 Sheets-Sheet 1
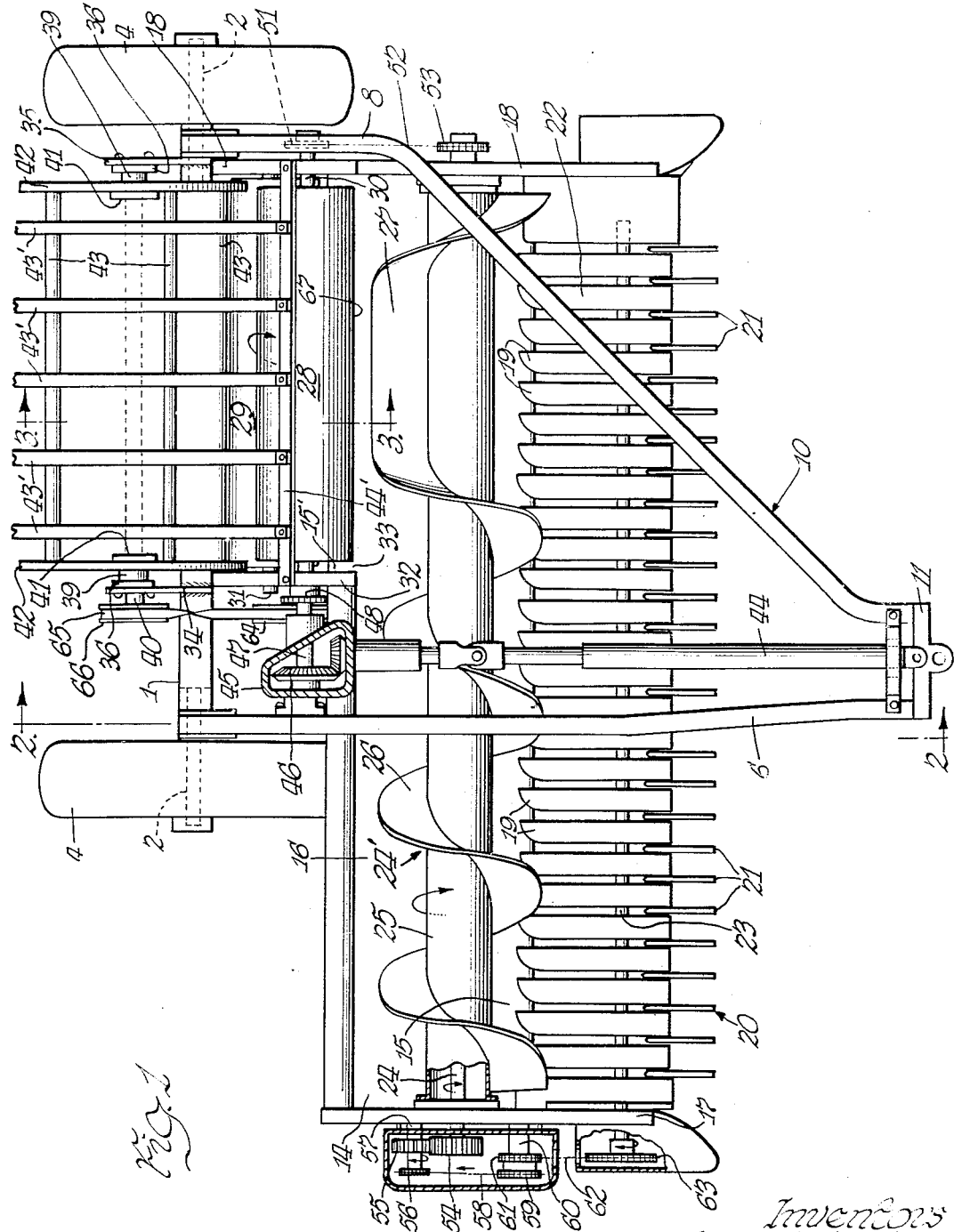
Inventors
Abraham Fenster
Ernest Scott Ulm, Jr.
Paul O. Rippel
Atty.

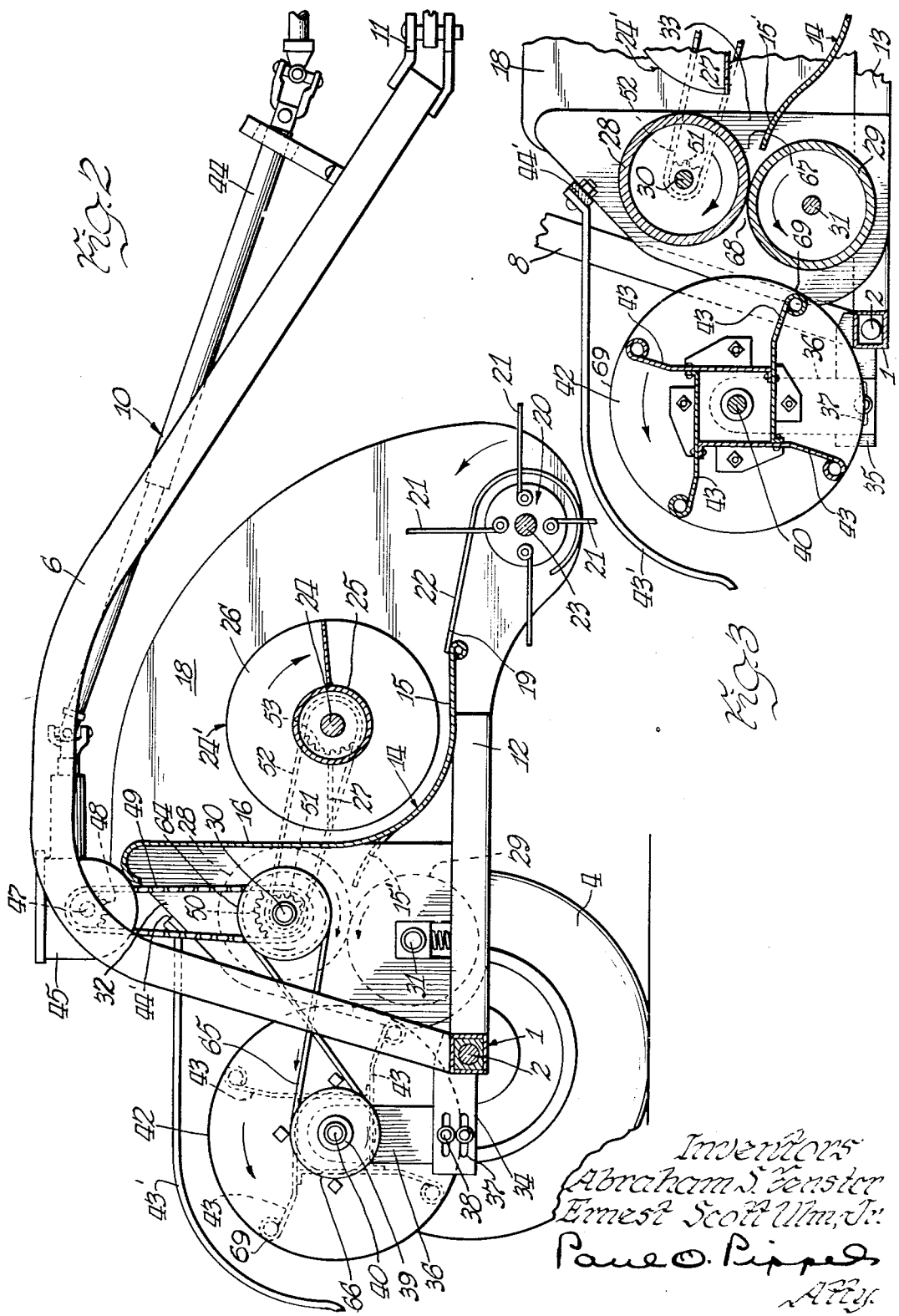

United States Patent Office 2,727,347
Patented Dec. 20, 1955

2,727,347
COMBINED HAY CRUSHER AND TEDDER

Abraham S. Fenster and Ernest Scott Ulm, Jr., Chicago, Ill., assignors to International Harvester Company, a corporation of New Jersey Application November 7, 1952, Serial No. 319,294

11 Claims. (Cl. 56—1)

This invention relates to a novel field traversing machine which is adapted to pick hay from the field directly after it is cut and crush it and then separate the hay to form loose aerated windrows which are conducive to rapid and effective drying.

A more specific object of the invention is to devise a mechanism wherein the tedding means is so juxtaposed with respect to the crushing means as to obtain an effective fluffing of the compressed ribbon of hay which is matted together immediately upon its issuance from between the discharge sides of the crushing rolls and before the hay touches the ground so as to positively eliminate admixing dirt into the hay such as would occur if the hay were allowed to drop to the ground and then tedded.

A still further object of the invention is to dispose the tedding means directly in back of the crushing means constituted of a pair of opposed crushing rolls wherein the tedding means passes peripherally close to the discharge sides of the crushing rolls and thereby obtains a wiping or sweeping action on the rolls to prevent excessive accumulation or wrap of material on said rolls.

A further object is to provide a compact machine which is adapted to pick, crush and ted hay in a continuous operation.

These and other objects of the invention will become more apparent from the specification and the drawings, wherein:

Figure 1 is a plan view of a novel mechanism incorporating the invention with parts shown broken away and in cross-section, Figure 2 is a cross-sectional view taken substantially on line 2—2 of Figure 1, and Figure 3 is a fragmentary cross-sectional view taken substantially on the line 3—3 of Figure 1.

Describing the invention in detail, the machine unit comprises an ambulant structure or support including a cross beam 1 with stub axles 2 having wheels 4, 4 journaled thereon. The beam 1 supports adjacent to opposite ends corresponding ends of side members 6 and 8 constituting an arch frame generally designated 10, said arch frame extending upwardly from the axle beam 1 and then being curved forwardly and then sloping downwardly forwardly whereat said members 6 and 8 converge into a hitch-tongue 11 adapted for connection in pivotal manner, as conventional, to the draw bar of an associated tractor.

The frame includes at its sides side sill members 12 and 13 (Figures 2 and 3) connected at their rear ends rigidly to the rear beam 1 adjacent each end and projecting forwardly therefrom.

The elements 12 and 13 mount and are weld-connected to the underside of a transverse trough 14. The trough 14 comprises a bottom panel or wall 15 and an adjoining rear panel 16 extending upwardly from the rear margin of the bottom panel. The trough or platform is closed at each end by means of upstanding side panels 17 and 18 joined thereto.

The forward edge of the bottom panel 15 of the trough 14 is connected to the rear extremities of a series of laterally spaced aligned stripper bars 19, 19 which extend forwardly of the panel 15 and then curve downwardly around and beneath a pickup drum generally designated 20 of conventional construction and including a center shaft 23 carrying a pickup tooth assembly including a series of tines 21, 21 which are arranged in interdigitating relationship with the stripper bars and adapted to sweep along the ground and upwardly along the forward side of the stripper bars and deposit the hay picked directly from the field onto the deck 22 defined by the upper portions of the stripper bars and move the same onto the bottom wall 15 of the trough. The center shaft 23 of the pickup drum is journaled at opposite ends in the end walls 17 and 18 which project forwardly from opposite ends of the trough.

A longitudinally extending auger 24' is disposed within the trough, the auger having a center shaft 24 journaled at each end in suitable bearings in the end walls 17 and 18 and carrying the outer core 25 through supporting discs, the core having a flighting 26 fixed thereto and spiraled in a manner whereby, upon sweeping downwardly it is adapted to shift the crop within the trough toward one end thereof. The flighting 26 is continued adjacent to one end of the auger into a crop-engaging paddle 27 which extends generally axially of the core radially outwardly therefrom and is adapted to transfer the hay shifted thereto by means of the spiral flight, in a path rearwardly under the auger and along an extension 15' of the bottom wall to between a pair of top and bottom crushing rolls 28 and 29, the crushing rolls extending generally parallel to the auger and being of slightly greater length than, and in transverse alignment with the paddle portion 27 of the auger immediately thereahead. The crushing rolls 28 and 29 have centershafts 30 and 31, respectively, journaled by means of bearings within rearward extensions of the panel 18 and a rearwardly angled portion 32 of the rear wall 16 of the trough which with the rearward extension of the panel 17 defines a discharge opening 33 through the rear side of the trough in alignment with the paddle portion 27 of the auger and the crushing rolls.

The cross beam 1 mounts the forward ends of a pair of rearwardly extending side beam members 34 and 35 and is connected thereto preferably as by welding. Each side beam 34 and 35 adjustably mounts an upstanding bracket 36 through the medium of slots 37 in the bracket, the slots admitting bolts 38 passing therethrough and through the member 34 or 35. The upper ends of the brackets 36, 36 are provided with bearings 39 through which extends a center shaft 40 for rotation. The shaft carries and is keyed to a plurality of axially spaced hub members 41, 41 which are bolted to circular end panels 42, 42 between which extend a plurality of circumferentially spaced panels or paddles 43, 43 and suitably connected thereto and the paddles together with the end plates and the shafting constituting a tedder drum adapted to beat the compressed ribbon of hay issuing from the discharge sides of the crushing rolls. It will be noted from a consideration of Figures 1 and 2 that the paddles pass with their outer peripheries closely to the rear sides of the crushing rolls and thereby function to prevent substantial accretion of the crop material on the rolls and thus maintains the same cleaned. In addition, the tedding means are so arranged as to intercept the discharging crop immediately as it issues from between the crushing rolls whereby to prevent its falling to the ground. In such position the tedding is performed by the tedding means rotating in a counter-clockwise direction as seen in Figures 2 and 3 as indicated by the arrow whereby the crop is thrown upwardly over the top and then deposited to the rear thereof upon the ground in a windrow of the width to which the crop is condensed by the auger. A series of guide fingers 43', 43' overlie the drum and control the spread of the crop. The fingers are mounted on a crossbar 44' connected to the rear edge of panel 18 and portion 32. The driving means for the various components comprises a power take-off shafting 44 which at one end is adapted to be telescoped in driving relationship to the power take-off shaft of the tractor and at the opposite end is connected through universal joints to a gear box 45 suitably connected through its housing to the adjacent side member 6 of the arch frame adjacent to the upper crest of its arch. The bevel gear assembly 46 within the gear box is connected to an output shaft 47 which is keyed to a sprocket 48 driving a chain 49 which in turn drives a sprocket 50 keyed and constrained for rotation with the shaft 30 of the crushing roll 28. The opposite end of the shaft 30 has a sprocket 51 keyed thereto and driving a chain 52 which drives a sprocket 53 keyed to the adjacent end of the center shaft of the auger. The opposite end of the center shaft 24 of the auger is keyed to a gear 54 driving a meshing gear 55 which is connected to a sprocket 56 and journaled therewith on a suitable spindle mounting 57 bolted to the adjacent end panel 17 of the trough. The sprocket 56 has chain 58 trained thereover and a sprocket 59 which is journaled by means of a spindle 60 carried by the end panel 17. The sprocket 59 is connected to a sprocket 61 which is constrained for rotation therewith. The sprocket 61 drives a chain 62 which drives a sprocket 63 keyed to the centershaft 23 of the pickup drum.

The shaft 30 of the upper crushing roll is also keyed to a pulley 64 driving a belt 65, the belt being crossed to reverse drive of a pulley 66 which is keyed to one end of the centershaft 40 of the tedder drum.

It will be noted that the pickup and the auger constitute charging means and deliver to the intake area or intake nip 67 of the auger which transfer the crop to the discharge area or discharge nip 68 whereat the periphery of the tedder drum passes in sweeping relationship to the discharge sides of the rolls or compacting means 28 and 29. It will be seen that this periphery 69 moves closer to the bottom roll 29 to compensate for gravitational tendency of the crop to fall upon the downwardly moving side or rear surface of the bottom roll 29 to lift the crop therefrom. The periphery 69 of the tedder is spaced slightly farther from or recedes from the rear or discharge side of the upper roll to facilitate passage of the crops between the same and said combined stripper and tedder drum.

We claim:

1. In a combined hay crushing and tedding field unit, an ambulant frame, a wide pick-up carried thereby in picking position to the ground and extending lengthwise transversely to the direction of travel of the unit, crushing means supported from the frame and having a length substantially less than said pick-up, conveying means on the frame between the pick-up and the crushing means and providing a delivery train from the full length of the former to the latter, and tedding means of a length substantially equal to that of said crushing means and carried on the frame in receiving and intercepting relationship to the hay issuing from the crushing means for tedding the hay and depositing it in a windrow upon the ground.

2. In a hay processing machine of the type described, an ambulant frame, compacting and crushing means and tedding means juxtaposed in consecutive operative series with respect to each other carried on said frame whereby said crushing means discharges directly to said tedding means, said tedding means spaced above the ground and discharging the hay in a windrow thereupon.

3. In a hay processing machine of the type comprising hay crusher and tedder, an ambulant carrier and crushing means supported thereby and means on the carrier operatively associated with said crushing means for feeding hay to the latter from the ground, the improvement comprising tedding means positioned across the discharge of the crushing means in intercepting relationship to hay issuing therefrom for tedding the same before it falls to the ground.

4. In a hay processing mechanism of the type comprising a field traversing frame, a crusher carried thereby and comprising a pair of opposed rolls rotatably supported from the frame in superposed relationship and providing an intake area at one side for accepting loose hay and a discharge area at the opposite side whereat issuing a compressed hay ribbon, and charging means carried on the frame and positioned in picking relationship to cut hay in the field and in delivering relationship to the intake of said rolls, the improvement comprising: a tedding drum rotatably carried by the frame and having its periphery moving through said discharge area along the adjacent sides of said rolls in stripping relationship thereto and in intercepting relation to the compressed hay ribbon issuing therefrom.

5. In an agricultural machine, an ambulant frame structure, an elongated transverse crop receiving trough carried thereby and having interconnected bottom, rear and end panels, a wide swath pick-up supported from the frame ahead of the trough in delivering relationship thereto and longitudinally coextensive therewith transversely of the machine and positioned in picking relationship to the ground, said rear panel having a crop receiving opening of substantially lesser length than said pick-up through which crops may be fed in a defined path, conveying and feeding means for moving the crop lengthwise of the platform to the opening and then feeding such crops along said path and through said opening, said means comprising an elongated tubular member rotatably supported on and extending lengthwise of the trough ahead of said opening, auger flight means fixed on said member and spiraled to move the crops lengthwise on said platform toward the opening, crop engaging means connected to said member ahead of the opening in fore and aft aligned relationships therewith and operative in response to rotation of said member to move the crop along said path through said opening, a pair of superposed crushing rolls of substantially the length of said openings rotatably supported from the frame structure across said opening behind said trough transversely to said path in close proximity to the peripheral extent of said crop engaging means and adapted to receive the crop therebetween for crushing and discharging the same therebehind, and tedding means rotatably carried by the frame behind the crushing rolls in the path of discharge and in receiving relationship to the crops issuing therefrom for tedding the same and depositing them upon the ground.

6. An agricultural machine according to claim 5 wherein said tedding means comprises a drum having a plurality of peripheral paddles, said drum rotating on an axis generally parallel to said rolls and spaced therebehind.

7. The combination according to claim 6 wherein said drum is rotatable in a direction whereat its side adjacent to the rolls moves upwardly so that the crops are carried thereby thereover.

8. The combination according to claim 6 wherein said paddles move in a peripheral orbit passing in close wiping proximity to the rolls.

9. The combination according to claim 6 wherein said paddles move in a peripheral orbit passing in closely spaced proximity to the lower of said crushing rolls and recedingly spaced from the upper of said crushing rolls.

10. In a hay crusher and tedder, a support, a pair of opposed crushing rolls carried by the support and having a crop intake nip at one side and a discharge nip at the opposite side, a tedding drum carried by the support in receiving relationship to the crushing rolls at said discharge, and a windrow-forming guide assembly carried by the support and disposed in partial confining overlying relationship to the tedding drum and providing a hay receiving space between the same and formed and arranged to control the deposition of the hay from the tedding drum upon the ground.

11. In a hay windrower machine, a support, a first means for picking a wide swath of hay from the field carried by the support, a second means for condensing the hay picked by said first means into a continuous narrow pile carried on the support in operative receiving relation to said first means, a third means for crushing the narrow pile of hay into a compressed narrow ribbon and disposed on said support in operative receiving relation to said second means, a fourth means on said support in operative receiving relation to said third means for fluffing said narrow compressed ribbon of hay, and a fifth means associated with the fourth for maintaining said hay the width of said narrow pile and ribbon and guiding said hay to the ground in a narrow windrow.

References Cited in the file of this patent

UNITED STATES PATENTS

| | | |
|---|---|---|
| 747,507 | Thach | Dec. 22, 1903 |
| 1,972,680 | Cushman | Sept. 4, 1934 |
| 2,484,981 | Coultas | Oct. 18, 1949 |
| 2,501,906 | Lorenz et al. | Mar. 28, 1950 |
| 2,529,577 | Schempp et al. | Nov. 14, 1950 |
| 2,571,652 | Bass | Oct. 16, 1951 |